United States Patent [19]

Whidden et al.

[11] Patent Number: 4,905,115
[45] Date of Patent: Feb. 27, 1990

[54] AUTOMATIC AND MANUAL DC POWER SWITCH

[75] Inventors: James R. Whidden, Baldwinsville; Paul H. Lindsay, Vernon, both of N.Y.

[73] Assignee: RCA Licensing Corporation, Princeton, N.J.

[21] Appl. No.: 160,899

[22] Filed: Feb. 26, 1988

[51] Int. Cl.⁴ .............................................. H02H 3/24
[52] U.S. Cl. .................... 361/92; 307/10.7; 307/130; 307/140; 320/1; 340/663
[58] Field of Search .................... 361/86, 88, 92; 307/130, 140, 10 R, 10 BP, 10.1, 10.7; 320/1; 340/660, 663

[56] References Cited

U.S. PATENT DOCUMENTS

| | | | |
|---|---|---|---|
| 3,646,354 | 2/1972 | Von Brimer | 307/10 BP |
| 3,656,045 | 4/1972 | Frezzolini et al. | 307/10 BP X |
| 4,005,344 | 1/1977 | Gaind et al | 307/10 BP X |
| 4,137,557 | 1/1979 | Ciarniello et al. | 307/10 BP X |
| 4,439,805 | 3/1984 | Tarleton | 361/92 |
| 4,493,001 | 1/1985 | Sheldrake | 361/92 |
| 4,530,027 | 7/1985 | Berger | 340/663 X |
| 4,724,332 | 2/1988 | Finger | 361/92 X |
| 4,736,145 | 4/1988 | Sakurai et al. | 361/92 X |

OTHER PUBLICATIONS

Radio Shack Catalog No. 419, Spring 1988, p. 147.

Primary Examiner—Derek S. Jennings
Attorney, Agent, or Firm—Joseph S. Tripoli; Peter M. Emanuel; Thomas F. Lenihan

[57] ABSTRACT

An automatic switching apparatus is disclosed for a system employing a battery and a charging device. A load is automatically disconnected in response to the decrease in voltage caused by an inactivation of the charging device so that the battery will not be undesirably discharges if the load is not turned off. An override switch is provided to allow the load to draw power even when the charging device is not operating.

12 Claims, 1 Drawing Sheet

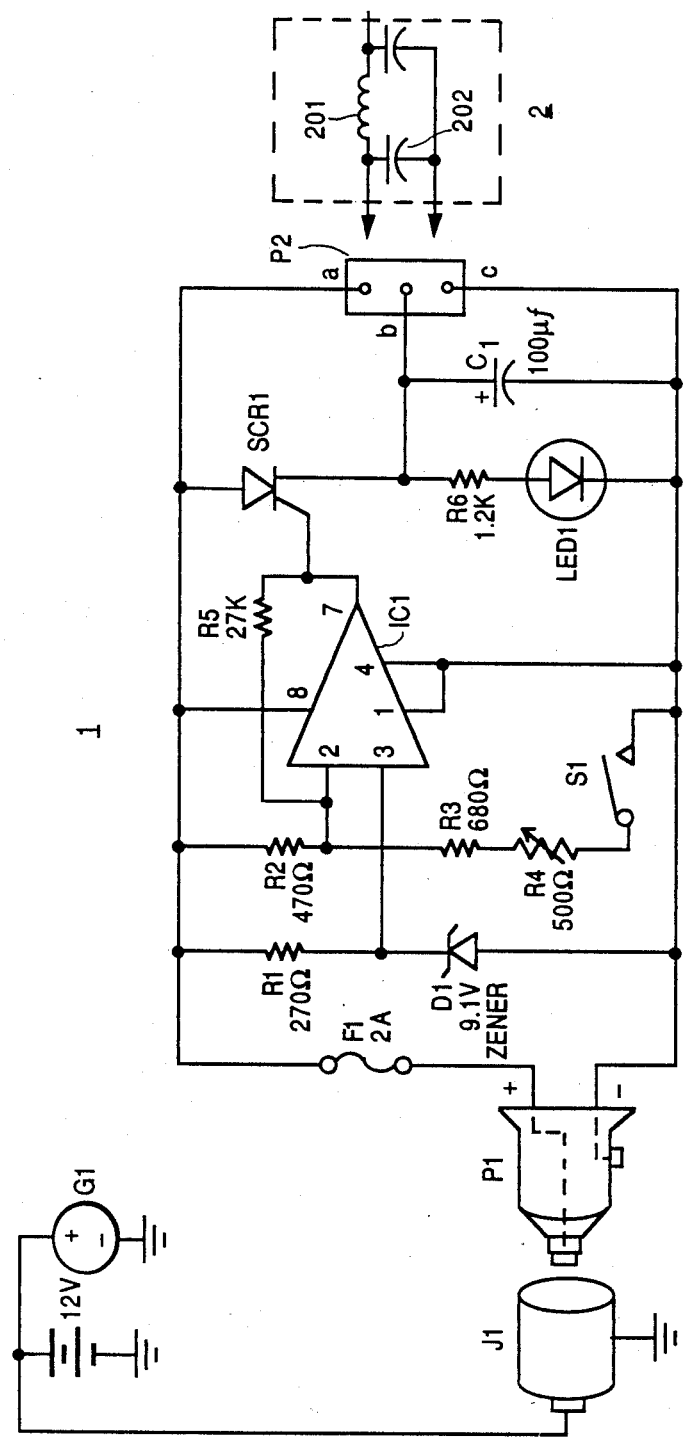

AUTOMATIC AND MANUAL DC POWER SWITCH

FIELD OF THE INVENTION

This invention relates to the field of direct current power switching circuits for use with a rechargeable battery and charging system.

BACKGROUND OF THE INVENTION

It is well known that in an automobile the electrical outlet intended for use with a cigarette lighter is a convenient electrical connection point from which to draw power for various accessories such as a citizens' band (CB) radio, for example. Connectors designed specifically for this purpose are known from the Spring 1988 Radio Shack Catalog No. 419, model numbers 270-1560 and 270-1562 shown on page 147.

When an accessory to be powered is connected to the cigarette lighter receptacle and turned on, it draws power from the automobile's battery and charging system. A problem arises when the automobile engine is turned off because the charging system is thereby disabled and the accessory, if left turned on, begins to discharge the battery. If this condition persists, the battery will be discharged to the point where its ability to be used in starting the automobile will be impaired or precluded.

A circuit for monitoring battery voltage and shutting off a regulated power supply connected to it when the battery discharges to a predetermined low level of voltage is known from an article in Electronic Designer's Casebook, 14-A, p. 80 published by McGraw-Hill, Inc., entitled "Battery discharge triggers alarm and shuts off supply" by Dean Jeutter. It is noted that because this circuit allows discharge of the battery to a predetermined low level, the battery may not be in a condition to be used in starting the automobile.

SUMMARY OF THE INVENTION

It is herein recognized that for a system employing a battery and a battery charging circuit for generating a supply voltage, it is desirable to provide an automatic power shut off feature for disconnecting an accessory from the battery in response to the reduction of the supply voltage level, caused by the disabling of the charging system, to a predetermined voltage level higher than the battery voltage level so that an accessory connected to the battery will not discharge the battery.

It is also recognized herein that in certain situations it may be desirable to override the automatic shut-off feature and thus allow the accessory to draw current from the battery even when the charging system is not operating.

BRIEF DESCRIPTION OF THE DRAWING

The sole FIGURE shows in schematic form an illustration of an embodiment of the invention.

DETAILED DESCRIPTION OF THE DRAWING

The circuitry 1 of the FIGURE receives operating power via plug P1 which may be a cylindrical shaped connector suitable for mating with an automobile cigarette lighter receptacle J1. The center conductor of receptacle J1 is coupled to the automobile's battery at the positive battery terminal and is, in most instances, unswitched. That is, when the ignition switch of the automobile is turned off, J1 remains powered. Receptacle J1 also has a cylindrical conductor formed on its inside wall for supplying a connection to ground (i.e. the negative battery terminal).

Modern automobiles employ an electrical system having a battery rated at a nominal 12 volts DC. In actual practice, however, a fully charged so-called 12 volt lead-acid battery measures approximately 13.2 volts.

The battery of the FIGURE is further coupled to a charging device (i.e. an alternator or generator) G1. The term "alternator" will be used hereinafter to refer to charging device G1 and is meant to include both alternators and generators. Charging device G1 is driven by the automobile engine to produce a charging current at a terminal voltage between approximately 14.8 volts and 15.3 volts DC.

Circuit 1 of the FIGURE supplies power to a load 2 which may be, for example, a citizen's band (CB) radio, via plug P2. Plug P2 includes three terminals, a, b, and c. Terminal c is coupled to ground, terminal a is coupled to the unswitched source of power, i.e., the battery via plug P1 and receptacle J1, fuse F1, and terminal b provides switched DC power to the load as will be described below. Terminal a of plug P2 couples positive battery voltage to the load at all times so that, for example information stored in a volatile memory which may be included within the load will not be lost.

IC1 is a voltage comparator integrated circuit such as an LM311 available from National Semiconductor Corporation. Terminal 3 of IC1 is the inverting input terminal, and is biased to a reference level of 9.1 volts by a voltage divider comprising resistor R1 and 9.1 volt Zener diode D1. Terminal 2 of IC1 is the non-inverting input terminal. When the alternator is not operating and switch S1 is closed, terminal 2 is biased to a voltage level less than 9.1 volts by a voltage divider circuit comprising resistors R2 and R3 and a potentiometer R4. A feedback resistor R5 is coupled between the output terminal 7 and the non-inverting input 2 of IC1 to provide positive feedback for rapid changes of state. Output terminal 7 of IC1 is coupled to the gate terminal of SCR1 to control the turn-on of SCR1. The anode of SCR1 is coupled to the positive power supply terminal of P1 and the cathode of SCR1 is coupled to the switched power output terminal b of P2, so that SCR1 acts as a series switch for transmitting or interrupting the flow of current to a load connected to terminal b of P2. The cathode of SCR1 is also coupled to the anode of light emitting diode (LED) 1 LED 1 via resistor R6. The cathode of LED 1 is coupled to ground so that when SCR1 is energized the resulting flow of current causes LED 1 to become illuminated, thereby acting as a power-on indicator for terminal b. A capacitor C1 is connected in parallel across the series combination R6 and LED 1.

The circuit will first be evaluated with switch S1 taken to be closed. As noted above, a fully charged lead-acid battery measures approximately 13.2 volts DC. When plug P1 is inserted into receptacle J1, terminal 3 of IC1 is impressed with a reference level of 9.1 volts DC. Terminal 2 of IC1 is impressed with an initial voltage level which is less than 9.1 volts. Because terminal 2 of IC1 receives a lower voltage than does terminal 3, the signal level at output pin 7 remains at approximately zero volts. Thus SCR1 is not turned on, and acts as an open switch between power (i.e. 13.2 volts developed when the battery is not being charged) and a load connected to terminal b of connector P2.

When the engine is started, however, the voltage at the positive + terminal of plug P1 rises to at least 14.8 volts due to the action of alternator G1. The 9.1 volt reference level at terminal 3 of IC1 is clamped by zener diode D1 and remains substantially constant. The voltage level at terminal 2 of IC1 is not clamped, and consequently rises to a value greater than 9.1 volts thereby producing a high level output voltage at terminal 7 of IC1 which is applied to the gate of SCR1, turning SCR1 on. SCR1 applies power to the load 2 via terminal b of connector P2. Due to the typical characteristics of SCRs, the voltage at the cathode of SCR2 is approximately 1 volt less than the voltage at its anode. Thus, for an alternator voltage of 14.8 volts, capacitor C1 and load 2 will receive approximately 13.8 volts.

When the ignition circuit of the automobile is turned off one might expect the voltage at the positive terminal + of P1 would quickly drop to the fully charged level of 13.2 volts. This is not the case, however, because of a phenomenon known as surface charge. When the alternator stops producing output voltage, the voltage at the battery terminals quickly drops to the surface charge value of approximately 13.6 volts where it remains for a period having a duration from between 15 seconds to a full minute depending upon the current draw from other loads such as headlights which may be coupled to the battery. As long as the surface charge level of 13.6 volts exists the voltage level at terminal 2 of IC1 will remain greater than 9.1 volts and terminal 7 of IC1 will continue to produce a high level signal and apply it to the gate of SCR1. The voltage across capacitor C1 will be at the voltage level at the cathode of SCR1 and will therefore be at 12.6 volts (i.e. 13.6–1 volts) until the surface charge begins to dissipate. Potentiometer R4 is adjusted such that the voltage at terminal 2 of IC1 will be 9.1 volts when the battery terminal voltage equals 13.4 volts. As the surface charge dissipates, the battery terminal voltage will slowly drop from 13.6 v through 13.4 v to a final value of approximately 13.2 volts. When the battery terminal voltage equals 13.4 volts, comparator IC1 switches state and removes the gate voltage from SCR1.

SCRs are not normally amenable to control via the gate terminal to stop current flow once they are triggered on. However, the particular SCR used in the embodiment is a sensitive gate SCR, such as C106F made by General Electric Co., and is subject to being turned off via the gate control signal as follows. When comparator IC1 switches state, the gate terminal of SCR1 is pulled down rapidly because of the low output impedance of comparator IC1 and the positive feedback around IC1. Capacitor 202 holds the cathode of SCR1 at a positive potential while the gate terminal is at approximately zero volts. Thus, the gate-to-cathode junction is reversed biased, and the comparator output pin 7 is sinking anode current, which causes SCR1 to turn off. Capacitor 202 is part of the π-section power line filter normally found in CB radios to prevent ignition nose interference. Originally, capacitor C1 was not included in the circuitry, but it was found that a purely resistive load coupled between terminal b of plug P2 and ground would not cause SCR1 to turn off. According, capacitor C1 was added to solve this problem by supplying the necessary capacitance otherwise provided by capacitor 202. If it is known that only loads incorporating a shunt capacitor will be connected to terminal b of plug P2, then capacitor C1 may be omitted.

Thus, circuitry has been disclosed which adds an automatic switching function for loads connected to the automobile's cigarette lighter receptacle. This switching function is responsive to the level of the alternator charging voltage to supply power to the load and responsive to the dissipation of the surface charge to automatically disconnect power from the load.

Recognizing that at times it becomes necessary to operate the load even though the alternator is not producing a charging voltage, the circuitry of the FIGURE provides a switch S1 which when opened allows operation of the load at those times. When switch S1 is opened, the voltage at terminal 2 of comparator IC1 rises from a level below the reference level of 9.1 volts at terminal 3, to a level above the 9.1 volt reference level. Consequently comparator IC1 switches state and produces a high level control signal at the gate of SCR1, turning SCR1 on and supplying power to the load. Turn off of SCR1 is accomplished by closing switch S1 thus pulling the voltage at terminal 2 of comparator IC1 to a lower level than the 9.1 volt reference level, and thereby causing comparator IC1 to change state and remove the control voltage from the gate of SCR1. Removal of the control voltage from the gate of the SCR interrupts the current flow through it, as described above, turning the SCR off.

While the invention has been described with reference to a cigarette lighter receptacle in an automobile, it is equally suitable for operation with any rechargeable battery used with a recharging system.

What is claimed:

1. An automatic power switching apparatus, for use in a vehicle including a rechargeable battery, having first and second battery terminals, and a charging device wherein the terminal voltage V1 between said first and second battery terminals is higher when said charging device is operating than the terminal voltage V2 between said first and second battery terminals when said charging device is not operating, comprising:
   power input connection means including a plug for mating with an accessory receptacle of said vehicle and having only two terminals, said two terminals being a power input terminal coupled via said accessory receptacle to said first battery terminal for receiving power from said battery and said charging device, and a reference potential terminal coupled via said accessory receptacle to said second battery terminal, said plug providing all of the electrical connection between said power switching apparatus and said vehicle;
   a power output terminal for supplying power to a load which may be connected thereto;
   first switch means coupled between said power input terminal and said power output terminal for selectively applying power to said power output terminal in response to a control signal;
   comparator means, coupled to said power input terminal, and responsive to the level of said terminal voltage for generating said control signal for controlling said first switch to decouple power from said output terminal when said voltage at said power input terminal is less than a predetermined threshold level, said predetermined threshold level being less than said battery terminal voltage V1 but greater than said battery terminal voltage V2; and second switch means, accessible to a user, and coupled to said comparator means for disabling the operation of said comparator means so that said output terminal is not decoupled from said power input terminal when said voltage at said power input terminal is less than said predetermined threshold level.

2. An automatic power switching apparatus, for use in a vehicle including a rechargeable battery, having first and second battery terminals, and a charging device wherein the terminal voltage V1 between said first and second battery terminals is higher when said charging device is operating than the terminal voltage V2 between said first and second battery terminals when said charging device is not operating, comprising:
power input connection means including a plug for mating with an accessory receptacle of said vehicle and having only two terminals, said two terminals being a power input terminal coupled via said accessory receptacle to said first battery terminal for receiving power from said battery and said charging device, and a reference potential terminal coupled via said accessory receptacle to said second battery terminal, said plug providing all of the electrical connection between said power switching apparatus and said vehicle;
a power output terminal for supplying power to a load which may be connected thereto;
means coupled between said power input terminal and said reference potential terminal, for developing a reference voltage at a reference voltage output terminal;
a voltage divider means, coupled between said power input terminal and said reference potential terminal, for developing at an output terminal, a voltage proportional to the voltage applied to said power input terminal;
comparator means having a first input terminal coupled to said reference voltage output terminal for receiving said reference voltage, a second input terminal coupled to said output terminal of said voltage divider means and an output terminal at which is developed a control signal in response to the relative levels of signals at said input terminals of said comparator means;
first switch means having an input terminal coupled to said power input terminal and an output terminal coupled to said power output terminal, and a control terminal coupled to said output terminal of said comparator means for receiving said control signal, said first switch means being responsive to the presence of said control signal for changing from a first high impedance state wherein substantially no current flows between said input and output terminals of said first switch means, and a second lower impedance state in which current flows between said input and output terminals of said first switch means;
wherein said comparator means is responsive to said battery terminal voltage V2 provided at said power input terminal when said charging device is not operating, for interrupting the flow of current between said power input terminal and said power output terminal; and
second switch means, accessible to a user, and coupled to said comparator means and to said voltage divider means for preventing said comparator means from coupling said control signal to said input terminal of said first switch means so that said first switch means is maintained in said second lower impedance state.

3. An automatic power switching apparatus, for use with a system including a rechargeable battery and a charging device comprising:
a power input terminal for receiving power from said battery and said charging device;
a power output terminal for supplying power to a load which may be connected thereto;
reference voltage developing means for developing and maintaining a substantially constant reference voltage at a reference voltage output terminal, said reference voltage developing means being coupled between said power input terminal and a source of reference potential;
a series combination of a voltage divider means, for providing a voltage proportional to the voltage applied to said power input terminal and a first switch means coupled between said power input terminal and said source of reference potential, said voltage divider means having an output terminal;
comparator means having a first input terminal coupled to said reference voltage output terminal for receiving said reference voltage, a second input terminal coupled to said output terminal of said voltage divider means and an output terminal at which is developed a control signal in response to the relative levels of signals at said input terminals of said comparator means; and
a second switch means having an input terminal coupled to said power input terminal and an output terminal coupled to said power output terminal, and a control terminal coupled to said output terminal of said comparator means for receiving said control signal, said second switch means being responsive to the presence of said control signal for changing from a first high impedance state wherein substantially no current flows between said input terminal of said second switch means and said output terminal of said second switch means, and a second lower impedance state in which current flows between said input and output terminals of said second switch means;
wherein said comparator means is responsive to a voltage level at said power input terminal, higher than said battery voltage, supplied by said charging device, for initiating the conduction of said second switch means when said first switch means is in a first position, and said comparator means is responsive to a voltage level supplied by said battery for initiating the conduction of said second switch means when said first switch means is in a second position; and
said second switch means is responsive to said control signal for interrupting the flow of current between said power input terminal and said power output terminal.

4. The apparatus of claim 2 wherein said rechargeable battery and charging device are included within a vehicle.

5. The apparatus of claim 4 wherein said power input terminal is included within a plug intended for mating with a cigarette lighter receptacle.

6. The apparatus of claim 3 further including a power on indicator means coupled between said power output terminal and said source of reference potential.

7. The apparatus of claim 3 further including capacitance means coupled between said power output terminal and said source of reference potential for ensuring the turn off of said second switch means.

8. In an electrical system including a rechargeable battery and a charging device, automatic power switching apparatus, comprising:

a power input terminal for receiving power from said battery and said charging device;

a power output terminal for supplying power to a load which may be connected thereto;

a reference voltage developing means for developing and maintaining a substantially constant reference voltage at a reference voltage output terminal, said reference voltage developing means being coupled between said power input terminal and a source of reference potential;

a series combination of a voltage divider means and a first switch means coupled between said power input terminal and said source of reference potential, said voltage divider means having an output terminal;

a comparator means having a first input terminal coupled to said reference voltage output terminal for receiving said reference voltage, a second input terminal coupled to said output terminal of said voltage divider for receiving a voltage proportional to the voltage applied to said power input terminal, and an output terminal at which is developed a control signal in response to the relative levels of signals at said input terminals of said comparator means; and a second switch means having an input terminal coupled to said power input terminal and an output terminal coupled to said power output terminal, and a control terminal coupled to said output terminal of said comparator means for receiving said control signal, said second switch means being responsive to the presence of said control signal for changing from a first high impedance state wherein substantially no current flows between said input terminal of said second switch means and said output terminal of said second switch means, and a second lower impedance state in which current flows between said input and output terminals of said second switch means;

wherein said comparator means is responsive to a voltage level at said power input terminal, higher than said battery voltage, supplied by said charging device, for initiating the conduction of said second switch means when said first switch means is in a first position, and said comparator means is responsive to a voltage level supplied by said battery for initiating the conduction of said second switch means when said first switch means is in a second position; and said second switch means is responsive to said control signal for interrupting the flow of current between said power input terminal and said power output terminal.

9. The apparatus of claim 8 wherein said rechargeable battery and charging device are included within a vehicle.

10. The apparatus of claim 9 wherein said power input terminal is included within a plug intended for mating with a cigarette lighter receptacle.

11. The apparatus of claim 8 further including a power on indicator means coupled between said power output terminal and said source of reference potential.

12. The apparatus of claim 8 further including capacitance means coupled between said power output terminal and said source of reference potential for ensuring the turn off of said second switch means.

* * * * *